United States Patent

[11] 3,628,284

| [72] | Inventors | George Soulakis<br>Los Angeles;<br>William R. Baynes; Harvey W. La Branche, both of Palos Verdes Peninsula, all of Calif. |
|---|---|---|
| [21] | Appl. No. | 7,487 |
| [22] | Filed | Feb. 2, 1970 |
| [45] | Patented | Dec. 21, 1971 |
| [73] | Assignee | Mattel, Inc.<br>Hawthorne, Calif. |

[54] MINIATURE HIGH-SPEED ELECTRIC TOY RACING VEHICLE WITH RECHARGEABLE BATTERY
52 Claims, 9 Drawing Figs.

[52] U.S. Cl. .................................................. 46/243 LV, 46/202
[51] Int. Cl. .................................................. A63h 29/22
[50] Field of Search .......................................... 46/201, 202, 243, 244

[56] References Cited
UNITED STATES PATENTS

| 2,829,285 | 4/1958 | Steiner et al. ............... | 46/243 M |
| 2,832,177 | 4/1958 | Mueller ...................... | 46/244 R |
| 3,218,757 | 11/1965 | Benkoe ....................... | 46/244 R |
| 3,474,567 | 10/1969 | McRoskey et al. ............ | 46/243 M |
| 3,484,986 | 12/1969 | La Branche et al. .......... | 46/201 |
| 3,503,151 | 3/1970 | White et al. ................. | 46/243 M |

Primary Examiner—Louis G. Mancene
Assistant Examiner—Robert F. Cutting
Attorney—Seymour A. Scholnick ABSTRACT: A lightweight support structure carrying front and rear wheel assemblies and carrying a rechargeable battery with electric circuitry including an on-off series connected switch and a battery charging arrangement, the circuitry connecting the battery to a self-contained high-speed electric motor except when the battery is being charged. The motor is directly coupled to the vehicle's driven wheel assembly for high-speed operation.

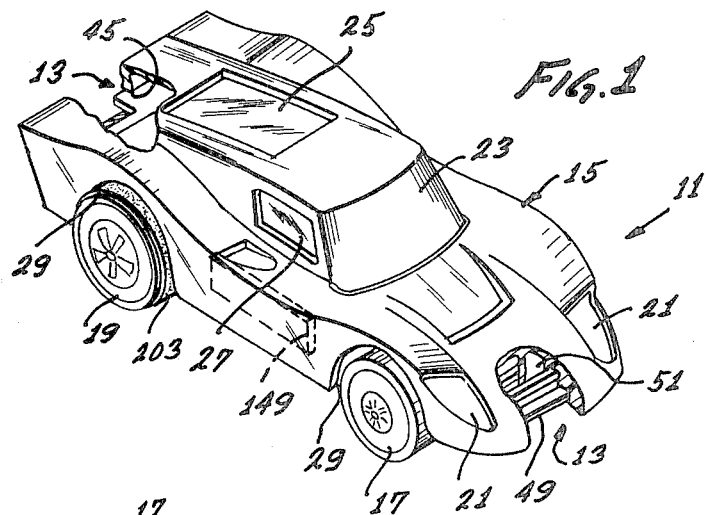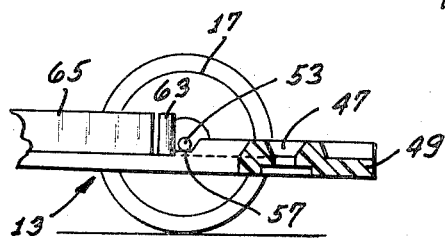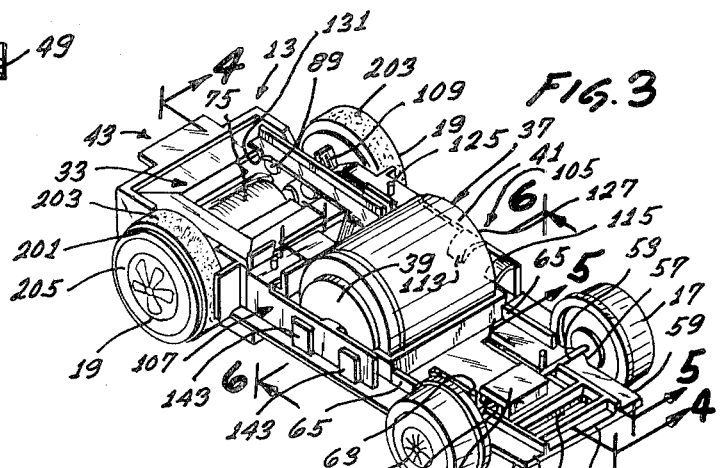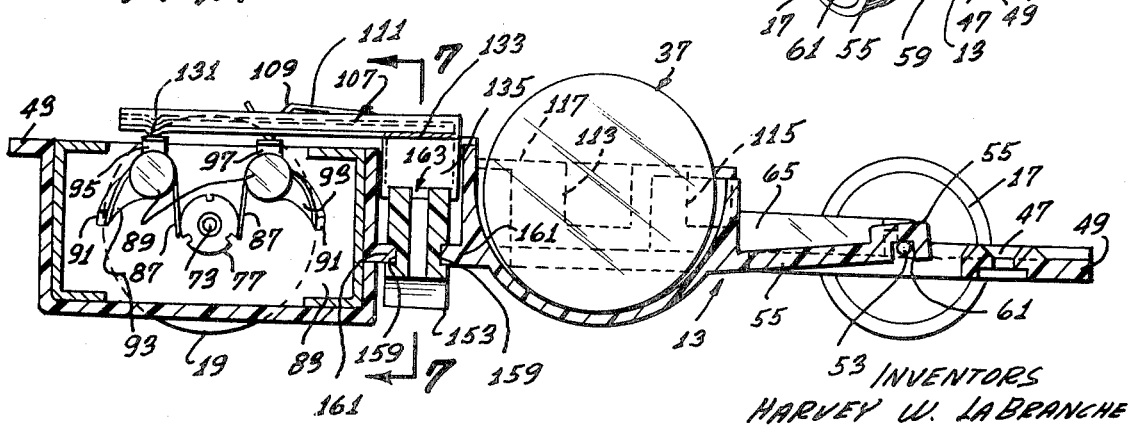

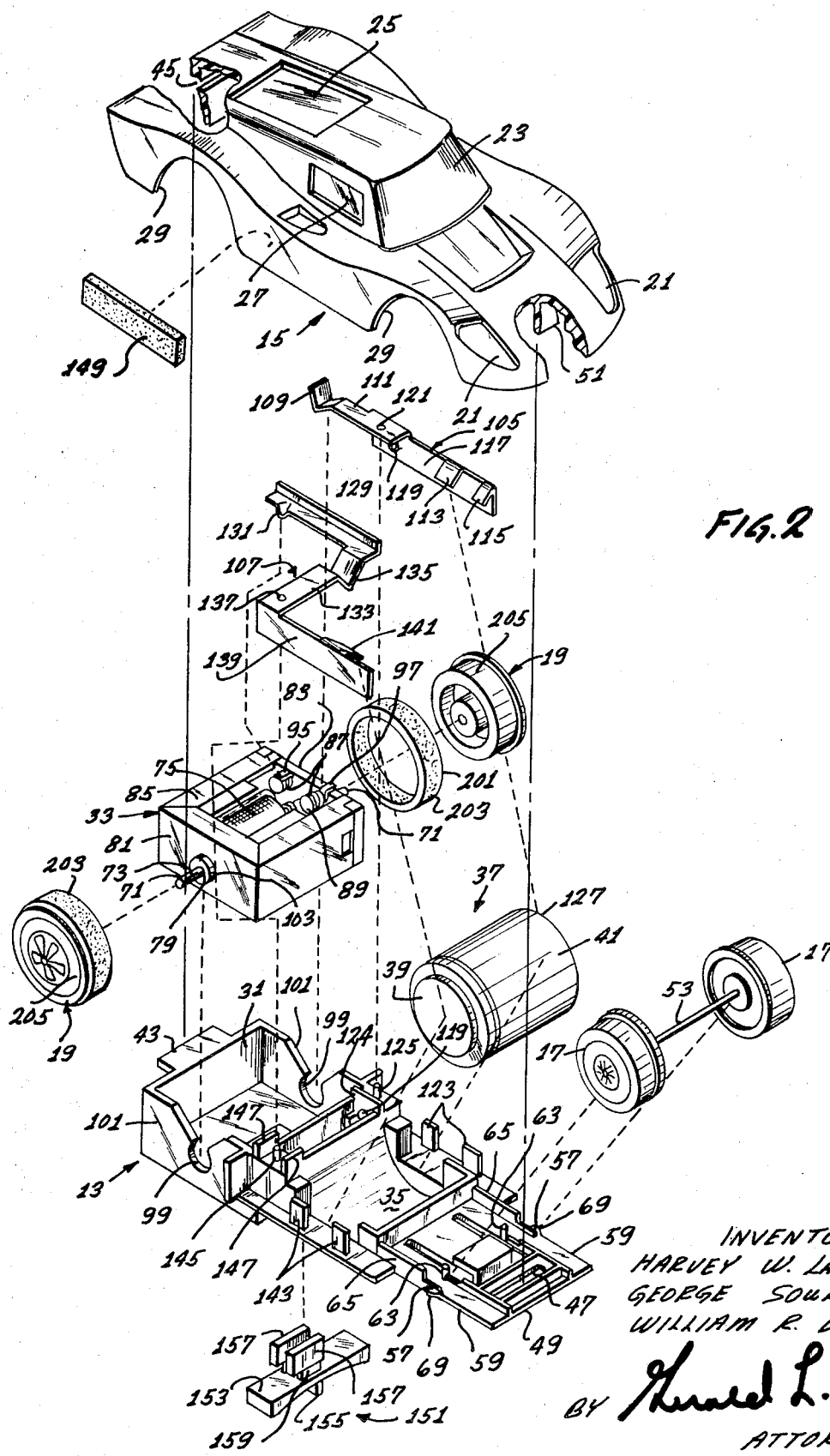

INVENTORS
HARVEY W. LaBRANCHE
GEORGE SOULAKIS
WILLIAM R. BAYNES

ATTORNEY

3,628,284

MINIATURE HIGH-SPEED ELECTRIC TOY RACING VEHICLE WITH RECHARGEABLE BATTERY

BACKGROUND OF THE INVENTION

The background of the invention will be set forth in two parts.

1. Field of the Invention

The present invention pertains generally to the field of toy vehicles and more particularly to a toy racing vehicle capable of very high-speed operation.

2. Description of the Prior Art

Toy car constructions which employ an electric motor and a self-contained battery are well known. These have generally taken the form of a standard flashlight battery powering a relatively slow-speed two-pole DC electric motor mechanically coupled to a driven wheel or wheels through a gear arrangement. The disadvantages of this arrangement are many, namely that the battery is not rechargeable and if rechargeable it must be first removed from the vehicle. Also, there is generally no means provided to disconnect the motor from the battery during charging in order not to overload the charging circuit, and the gear arrangement is very inefficient. Further, the support and body structure used in the past are relatively heavy which adds to the battery drain and prevents high-speed operation.

SUMMARY OF THE INVENTION

In view of the foregoing factors and conditions characteristic of electric motor driven toy vehicle constructions, it is a primary object of the present invention to provide a new and improved miniature electric toy vehicle not subject to the disadvantages enumerated above and having a novel direct arrangement which with other features of the invention allows the toy to travel at speeds heretofore unattainable.

Another object of the present invention is to provide a miniature high-speed electric toy racing vehicle which provides for recharging a self-contained rechargeable battery while automatically disconnecting the vehicle's electric motor to prevent charging circuit overloading.

Still another object of the present invention is to provide a miniature high-speed electric toy racing vehicle which automatically prevents charging of the self-contained rechargeable battery with reverse polarity charging current if even the battery is placed in the vehicle in the wrong direction.

Yet another object of this invention is to provide a miniature high-speed electric toy racing vehicle which utilizes driven wheels with plastic track gripping running surfaces.

It is a further object of the present invention to provide a miniature high-speed electric toy racing vehicle utilizing a unique front wheel suspension arrangement to allow springing action downwardly as well as upwardly.

According to the present invention, a miniature high-speed electric toy racing vehicle is provided in which front and rear rotatable wheel assemblies are carried by support structure means. Also carried by the structure means is rechargeable DC potential source and a DC electric motor, the motor having power input terminals and a rotatable armature shaft directly driving one of the wheel assemblies. Electrically connected to the rechargeable DC potential source and to the DC electric motor power input terminals is a switch means for making and breaking electric current flow between the potential source and the motor. Also, charging means is electrically connected to the rechargeable DC potential source for applying charging current thereto.

The direct drive may be provided by mounting the drive wheels directly on opposite ends of the electric motor's armature shaft which extends beyond the motor's housing.

In order to prevent the possibility of damaging the rechargeable potential source or battery if it is ever mounted in the wrong direction, a double contact negative contact member is utilized to short the positive battery terminal to its negatively poled case.

The toy may also include a specially designed charging current connector which disconnects the electric motor from the battery circuit when the battery is being charged by mechanically lifting a contact member disposed between a battery terminal and a power input terminal of the motor.

The features of the present invention which are believed to be novel are set forth with particularlity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is a perspective view, partially broken away, of a miniature high-speed electric toy racing vehicles constructed according to the present invention;

FIG. 2 is an exploded view showing the various elements included in the embodiment of the invention of FIG. 1;

FIG. 3 is a perspective view of the vehicle shown in FIG. 1 with the body removed;

FIG. 4 is a cross-sectional view taken along the line 4—4 in FIG. 3, the line being parallel to the longitudinal axis and direction of travel of the vehicle;

FIG. 5 is a cross-sectional view showing in detail the front wheel assembly of the vehicle, the view being taken along the line 5—5 in FIG. 3;

DESCRIPTION OF THE PREFERRED EMBODIMENT

Figure 6:
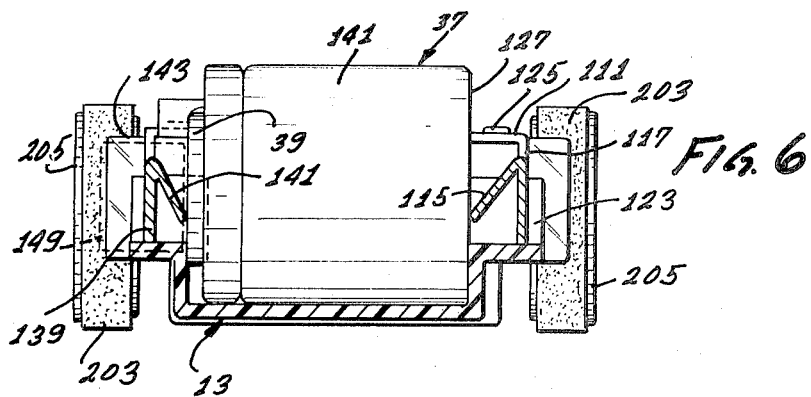
FIG. 6 is a cross-sectional view transversely to the longitudinal axis of the vehicle, taken along the line 6—6 in FIG. 3.

Referring again to the drawings and more particularly to the toy vehicle illustrated in FIG. 1 which constitutes a presently preferred embodiment of the invention, generally designated 11, the vehicle 11 includes an undercarriage or chassis 13, a sport car simulating body member 15 removably mounted on the chassis 13, and a front and rear wheel 17 and 19 respectively part of the vehicle's rotatable front and rear wheel suspension systems. The body member 15 has details of headlamp assemblies 21, a front windshield 23, and a large rear window 25. Also shown is a side window 27 and wheel fender areas 29 to accommodate the wheels 17 and 19.

As seen more easily in FIG. 2, the chassis 13 is provided with a motor compartment 31 to hold a high-speed DC electric motor 33, and a battery compartment 35 to hold a rechargeable DC potential source such as a nickel-cadmium cell 37 having a positive battery electrode 39 and a negatively poled case electrode 41. The chassis also includes a rear tab 43 positionable in a flat slot 45 in the body 15, and a forward transverse slot 47 adjacent the chassis' front end 49 to hold a downwardly extending body tab 51, the associated tabs and slots providing a convenient method of removably holding the body 15 to the chassis 13.

The front wheel suspension assembly, also seen in FIGS. 3–5, includes the front wheels 17 rotatably mounted on the ends of a relatively small diameter-flexible steel axle 53. The axle 53 is held down by a flexible arm extension 55 midway along its length and against a relatively slightly raised step portion 57 at the side edges 59 of the chassis 13 adjacent the wheels 17. The axle is captured in this position by an elongated slot 61 in the arm extension 55 transverse to the longitudinal axis of the vehicle 11, and also by a pair of upstanding posts 63 which are integrally molded as part of the chassis 13. It can be seen that in this way there is a downward force at the center of the flexible axle 53 produced by the arm extension 55 and also a slightly upward force at each of the side edges 59 produced by the raised step portions 57, to allow both upward and downward flexing of the axle 53 at its ends. Alternately, upstanding side members 65 need not only be used to stiffen the forward portion of the chassis 13 but may be extended further forward to the axle 57 to replace and perform the same function as the posts 63. Further, in order to prevent wheel hubs 67 of the wheels 17 from contacting the edges 59 of the chassis 13 and cause excessive friction and consequent loss of speed, the chassis 13 also includes relatively small side projections 69 under the position of the axle 53.

The rear wheel assembly on the other hand, particularly referring to FIGS. 2-5, is an intimate part of the motor 33 by having the rear wheels 19 fixed to the ends 71 of the motor's armature shaft 73. Mounted on the shaft is a three-pole armature 75 and a three-segmented commutator 77, these elements of the motor being disposed between end bearing portions 79 in end plates 81 and 83 of the motor's easing 85. In contact with the commutator 77, are a pair of brush elements 87 which are here in the form of flat wires of springlike metal which are wrapped a few turn about retaining posts 89 in the end plate 83, of insulating material, and anchored at their other ends by retaining tabs 91 extending from arms 93 held between the posts 89 and the inner surface of the end plate 83. The arms 93 also include motor power input terminals 95 and 97, the first extending above and toward its associated post 89 and the other extending above and away therefrom. The motor 33 is conventional in design with stress being laid to low voltage input high-speed output operation. It is retained in the motor compartment 31 of the chassis 13 by circular notches 99 provided in sidewalls 101 of the chassis, which notches snap over and hold the motor's end bearing projections 103 as clearly shown in FIG. 2.

Electrical power is supplied to the motor 33 from the battery 37 by means of electrical circuitry including a stationary conductor 105 and a movable arm conductor 107, probably most clearly illustrated in FIG. 2. The stationary conductor 105 is a formed metal plate having springlike characteristics such as a brass alloy and having a V-shaped motor contact end 109 in a horizontal portion 111 and a pair of spaced battery contact tabs 113 and 115 along a vertical portion 117. This conductor also is provided with a charging plug contact aperture 119 approximately in the center of the conductor in its vertical portion 117, and a smaller conductor retaining hole 121 in the conductor's horizontal portion 111, above the aperture 119. The stationary conductor 105 is held in place on the chassis 13 by the positioning of its vertical portion 117 along the inside of two upstanding flat chassis projections 123 and the horizontal portion 111 adjacent a projection 124, with a small diameter contact retaining post 125 in the hole 121. In this manner the motor contact end 109 is in electrical contact with the motor power input terminal 97 and the contact tabs 113 and 115 are in electrical contact with the negatively poled battery case 41 at its end 127 opposite the battery's positive electrode 39.

The movable arm conductor 107 on the other hand includes an L-shaped movable arm portion 129 of preferably resilient material having a motor contact end 131 at one of its ends and connected at the opposite end to a perpendicular switching portion 133 having a V-shaped, downwardly extending projection 135 adjacent to the arm portion 129. The switching portion 133 has its broad wall surfaces in a horizontal plane and includes a relatively small hole 137 adjacent the opposite end of the switching portion from the movable arm portion 129. The conductor 107 is also provided, by bending, a vertically disposed stationary arm portion 139 having a positive battery contact tab 141. The movable arm conductor 107 is retained on the chassis 13 by having the stationary arm portion 139 lying along the inner surfaces of a pair of upstanding chassis projections 143 and having a small diameter conductor retaining post 145 extending through the hole 137 in the switching portion 133. Further support is provided for the conductor 107 by a pair of upstanding tabs 147 adjacent the post 145.

The motor's electrical power circuit is completed when the positive battery contact tab 141 is pressed against the positive battery electrode 39 (as shown in FIG. 6) and when the motor contact end 131 is pressed against the rearwardly disposed motor input terminal 95 by the manner in which the conductor is formed. In this configuration, the motor 33 will be energized to cause the wheels 19 to revolve at high speed.

It is to be noted that both the positive battery contact tab 141 and the negative contact tab 113 are aligned with the longitudinal axis of the battery 37. The tab 115 is spaced from the tab 113 and is in contact with a peripheral portion of the end of the battery. In this fashion, the positive terminal 39 of the battery is short circuited by the negative battery case 41 should the battery be mistakenly positioned in the vehicle in a reversed fashion; that is, if the positive electrode of the battery is pressed against the tab 113, a circuit along the battery case is formed between tab 115 and tab 14.

FIG. 6 also illustrates the positioning of a spongelike multicellular pad 149 (dashed line) positioned alongside of the chassis projections and extending toward the battery's positive electrode 39. The pad 149 may be retained adjacent this end of the battery 37 by gluing or otherwise attaching it to the inside surface of the vehicle's body 15. The purpose of the pad is to absorb any corrosive or skin irritating chemicals which may leak from a battery through any cause. Since the battery's seal is adjacent its positive electrode, the battery would leak, if at all, in this area. Accordingly, it should be clear that the principal purpose of the absorbing pad 149 is to prevent the possibility of any undesirable contact with any chemicals which may leak from the battery by any person using the invention.

Figure 7:
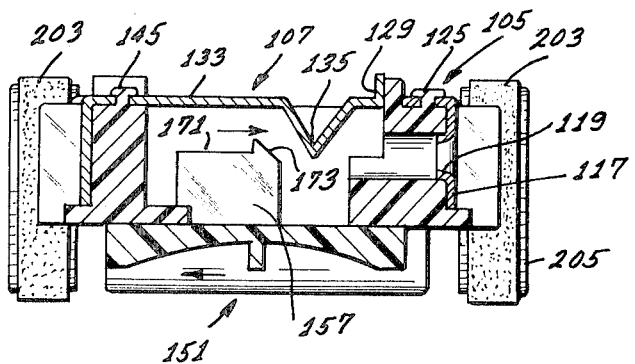
FIG. 7 is another transverse cross-sectional view, this time taken along the line 7—7 in FIG. 4 and showing the vehicle's power switch in its "ON" position and the battery not being charged.

The vehicle's circuit can be broken, by moving a manually operated sliding switch lever 151, from an "on" position (see in FIG. 7) near the post 145 laterally toward the oppositely disposed post 125 where its "off" position is located. The lever 151 has an elongated body 153, a downwardly extending centrally disposed finger tab 155 and a pair of adjacent upstanding-projection engaging members 157. As can best be seen in FIGS. 2 and 4, the members 157 have notches 159 in the lower outer surfaces thereof in which edges 161 of an elongated slot 163 in the chassis 13 are situated. To install the lever 151 in the slot 163, the upper portions of the members 157 are forced together and forced into the slot until the edges 161 enter the notches 159.

Figure 8:
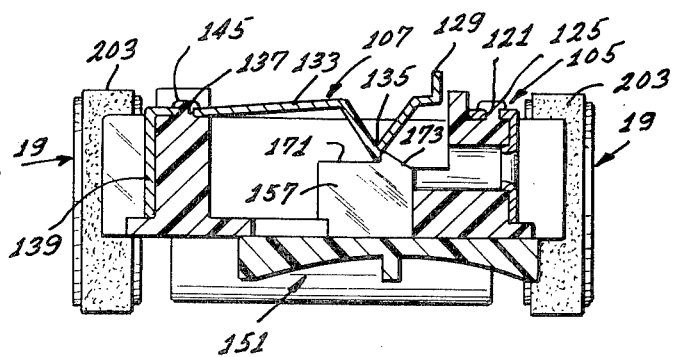
FIG. 8 is the same view as the last but showing the power switch in its "OFF" position.

In the "off" position, as illustrated in FIG. 8, the upper portions 171 of the members 157 engages the V-shaped projection 135 of the conductor 107 and forces the portion 133 to bend upwardly to lift the arm portion 129 and break the electrical contact between the contact end 131 and the input terminal 95. The portion 171 of the members 157 is provided with a sloping projection 173 so that once snapped into the "off" position, the lever 151 will not, without positive manual force, move to the "on" position.

Figure 9:
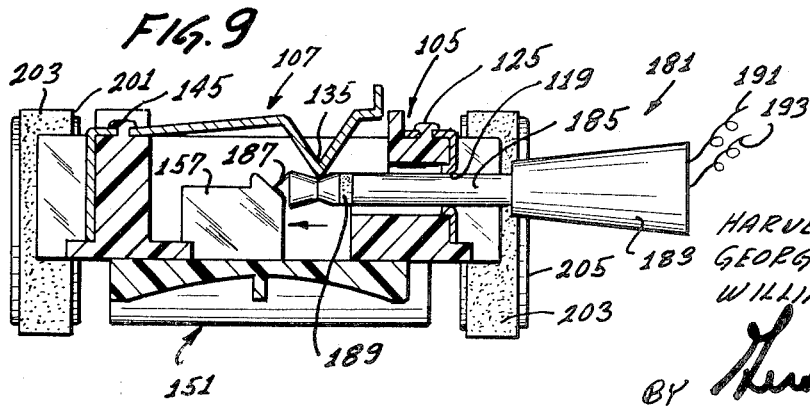
FIG. 9 is again the same view, this time with the battery charger's plug inserted in the vehicle's charging current input receptacle.

Referring now to FIG. 9, the charging configuration of the toy is illustrated. To charge the battery 37 an electrical connector plug 181 having an insulated handle 183, an elongated tubular sleeve 185 and a metal tip 187 insulated from the sleeve 185 by an annular insulating washer 189 is inserted into the charging plug contact aperture 119. The sleeve 185 and the tip 187 are connected by separate insulated wires 191 and 193 to a conventional battery charging source, not shown, or preferably to a specially advantageous quick charging source of the type described in copending U.S. Pat. application Ser. No. 812,754 dated Apr. 2, 1969 and assigned to the assignee of the present invention. With the plug so installed, charging current from a negative terminal of the charging source is applied to the battery case 41 through contact between the sleeve 185 and the conductor 105. At the same time, the tip 187 contacts the projection 135 and the positively poled charging current thereby flows from the tip 187 and into the conductor 107 to the positive electrode of the battery.

It can be seen from this figure that the action of inserting the plug 181 into the vehicle 11, pushes the lever 151 to its "on" position if it happened to be otherwise situated, and also lifts the conductor 107 to break the contact between the contact end 131 of the conductor 105 and the motor terminal 95. In this way the motor 33 is never in the charging circuit to load the charger.

The vehicle 11 is preferably run on a flexible plastic track of the type described in U.S. Pat. No. 3,487,999 assigned to the assignee of the present invention. In order to assure adequate traction between the track surface and the driven wheels 19, a relatively thin resilient belt 201 having a flat track gripping surface 203 is positioned on a wheel hub 205.

From the foregoing it should be evident that there has been disclosed a very high speed and efficient racing vehicle which incorporates a rechargeable battery with a novel power switch and charging arrangement.

This invention having been described in its preferred embodiment, it is clear that it is susceptible to numerous modifications and embodiments within the skill and without the exercise of the inventive faculty of the routine engineer.

What is claimed is:

1. A miniature high-speed electric toy racing vehicle with a rechargeable battery, comprising:
   front and rear rotatable wheel assemblies;
   support structure means for carrying said front and rear rotatable wheel assemblies;
   a rechargeable DC potential source carried by said structure means;
   a DC electric motor carried by said structure means, said electric motor having power input terminals and a rotatable armature shaft carrying and thereby directly driving at least one of said rotatable wheel assemblies;
   circuit means electrically connected to said rechargeable DC potential source for applying a current thereto; and
   switch means electrically connected to said rechargeable DC source and to said DC electric motor power input terminals for making and breaking electric current flow between said source and said motor.

2. A toy racing vehicle according to claim 1, wherein said one of said rotatable wheel assemblies includes a wheel mounted on said armature shaft.

3. A toy racing vehicle according to claim 1, wherein said armature shaft extends outwardly on both sides of said motor orthogonally to the direction of vehicle travel, and wherein said one of said rotatable wheel assemblies includes a running surface engaging wheel mounted on said armature shaft adjacent each end thereof.

4. A toy racing vehicle according to claim 1, wherein said circuit means also includes means for electrically disconnecting said DC electric motor from said current when said DC potential source is being recharged.

5. A toy racing vehicle according to claim 4, wherein said circuit means further includes means preventing the applying of the wrong polarity charging current to said DC potential source when said source is incorrectly positioned in said toy.

6. A miniature high-speed electric toy racing vehicle with rechargeable battery, comprising:
   front and rear rotatable wheel assemblies;
   relatively lightweight support and body structure, said front and rear rotatable wheel assemblies being carried by said structure;
   a rechargeable battery carried by said structure;
   a DC high-speed electric motor carried by said structure, said motor having a motor housing, power input terminals, and a rotatable armature shaft extending beyond said motor housing on opposite sides thereof, the axis of rotation of said armature shaft being orthogonal to the direction of vehicle travel, said armature shaft fixedly carrying the wheels of said rear wheel assembly one adjacent each end thereof;
   electric circuit means electrically connected to the terminals of said battery and to said motor power input terminals for carrying electric current from said battery to said electric motor;
   electric switch means included in said electric circuit means for selectively preventing the flow of said electric current from said battery to said electric motor; and
   charging means including a charging current input connector carried by said structure and electrically connected to said electric circuit means for providing electric charging current to said battery and at the same time for preventing the flow of said electric current from said battery to said electric motor.

7. A toy racing vehicle according to claim 6, wherein said electric switch means includes a movable contact member disposed between one of said terminals of said battery and one of said power input terminals of said electric motor, said switch means also including a manually operated movable member which when positioned in an off position separates and breaks electrical contact between said movable contact member and said one of said power input terminals.

8. A toy racing vehicle according to claim 7, wherein the utilization of said charging current input connector separates and breaks electrical contact between said movable contact member and said one of said power input terminals; wherein said battery is a nickel cadmium cell with a positive and negative battery terminals, and wherein said electric circuit means includes a single positive contact member on the longitudinal axis of said battery and a dual negative contact member at the opposite end of said battery, one of said negative contacts being on the longitudinal axis of said battery and the other being spaced therefrom and in contact with the peripheral end of said battery, whereby said positive battery contact is shorted by said negative contact member to the negative pole of the battery case when said battery is mistakenly positioned in said vehicle in the wrong direction.

9. A toy racing vehicle according to claim 6, wherein said motor is a high-speed three-pole motor having a three-segmented commutator mounted on said armature shaft and cooperating with two oppositely disposed brushes, said brushes being in electrical contact with said power input terminals.

10. A toy racing vehicle according to claim 6, wherein said support and body structure includes a relatively lightweight plastic chassis and a detachable relatively lightweight body; wherein said battery includes a case having a mechanical seal; and wherein an absorbing pad is disposed adjacent said seal to prevent spillage of any chemical from said battery at said seal.

11. A toy racing vehicle according to claim 10, wherein said seal is at the positive electrode of said battery, and wherein said pad is attached to an inside surface of said body opposite said positive electrode of said battery.

12. A miniature electric toy vehicle comprising:
   a chassis;
   a front pair of wheels and a rear pair of wheels connected to said chassis;
   an electric motor mounted to said chassis, said electric motor having a rotatable armature shaft carrying at least one of said wheels for directly driving said wheels;
   rechargeable battery means operatively connected to said motor;
   a body member mounted to said chassis to cover said electric motor and battery means; and
   means for connecting said battery means to an external charging source whereby said connecting means will disconnect said battery from said motor.

13. A toy vehicle as claimed in claim 12, wherein said shaft is connected to one of said rear wheels.

14. A toy vehicle as claimed in claim 12, wherein said electric motor has said shaft extend outwardly from a motor housing to directly connect to each of said rear wheels.

15. A miniature electric toy vehicle as claimed in claim 12, wherein said chassis has a rearwardly extending tab; and said body member has means for engaging said chassis tab for locating and positioning said body member relative said chassis.

16. A toy vehicle as claimed in claim 15, wherein said body member includes a slot for receiving said tab.

17. A miniature electric toy vehicle comprising:
a chassis;
a front pair of wheels and a rear pair of wheels connected to said chassis;
an electric motor mounted to said chassis;
a generally cylindrical battery mounted to said chassis;
circuit means for electrically connecting said motor and said battery; and
a switch for selectively interrupting electrical contact between said battery and said motor, said circuit means having a tab located to engage a center portion of one end of said battery and at least two tabs located to engage a center portion and a peripheral portion of the other end of said battery whereby a short circuit is created should the battery be mounted to said chassis in a reversed fashion.

18. A circuit for a toy vehicle having a battery comprising:
a chassis;
a front pair of wheels and a rear pair of wheels connected to said chassis;
an electric motor mounted to said chassis;
circuit means for electrically connecting said motor and said battery;
a first tab for engaging the positive terminal of said battery and a second tab for engaging the negative terminal of said battery when said battery is properly located;
when said battery is improperly located, said first and second tabs each engage said negative terminal of said battery.

19. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery operable when placed in only one specific attitude, a small electric motor, electrical circuitry connecting battery and the motor, a switch for selectively electrically interrupting said circuitry and a body member connected to the chassis in combination with said toy vehicle of a tab connected to and extending away from the chassis; and a slot within a body member, said tab being received in said slot for locating and attaching said body member relative said chassis.

20. A toy vehicle as claimed in claim 19, wherein said tab is adjacent said pair of rear wheels.

21. A toy vehicle as claimed in claim 20, wherein said tab extends parallel to the direction of movement of said vehicle.

22. A toy vehicle as claimed in claim 21, wherein said chassis includes an opening adjacent the pair of front wheels for cooperating with said body member to attach said body member and said chassis.

23. A toy vehicle as claimed in claim 22, wherein said opening is a slot and said body member includes a tab for being received in said slot.

24. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, electrical circuitry connecting the battery and the motor, a switch for selectively electrically interrupting said circuitry and a body member connected to the chassis the combination with said toy vehicle of an armature shaft and a motor housing included with the motor, said shaft extending away from said motor housing and directly carrying at least one of the two rear wheels.

25. A toy vehicle as claimed in claim 24, wherein said shaft extends away from said motor housing in opposite directions and each of said rear wheels are connected to the opposite ends of said shaft.

26. A miniature toy vehicle as claimed in claim 24, including a resilient running surface about the rear wheels.

27. A toy vehicle as claimed in claim 26, wherein said resilient running surface is a resilient annular peripheral belt.

28. A miniature toy vehicle as claimed in claim 27, wherein said belts are removable from said rear wheels.

29. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, electrical circuitry connecting the battery and the motor, a switch for selective electrically interrupting said circuitry and a body member connected to the chassis the combination with said toy vehicle of the switch depending from a bottom side of the chassis and movable in a direction lateral to the direction of movement of said vehicle; and including means for receiving a plug to recharge said battery, said switch cooperating with said plug to electrically disconnect said battery and said motor.

30. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, electrical circuitry connecting the battery and the motor, a switch for selectively electrically interrupting said circuitry and the body member connected to the chassis the combination with said toy vehicle of the switch positioned to require activation from a bottom side of the chassis; and including means for receiving a plug to recharge said battery, said switch cooperating with said plug to electrically disconnect said battery and said motor.

31. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, electrical circuitry connecting the battery and the motor, a switch for selectively electrically interrupting said circuitry and a body member connected to the chassis the combination with said toy vehicle of the electrical circuitry comprising a flexible strip of metal; and including means for receiving a plug to recharge said battery, said switch cooperating with said plug to electrically disconnect said battery and the said motor.

32. A toy vehicle as claimed in claim 31, wherein the switch includes a cam surface for moving the strip of metal from one position to another.

33. A toy vehicle as claimed in claim 32, wherein said switch is movable in a direction transverse to the direction of movement of the vehicle.

34. A toy vehicle as claimed in claim 33, wherein said switch is located between the battery and the motor.

35. A toy vehicle as claimed in claim 31, wherein the switch includes an electrically insulative cam surface for engaging said strip and causing said strip to change positions.

36. A toy vehicle as claimed in claim 35, wherein said strip is bent at the engagement location with said cam surface.

37. A toy vehicle as claimed in claim 35, wherein said chassis includes an opening for receiving an electrical contact element to charge said battery, said switch having a surface for being engaged by said electrical contact element for moving said switch.

38. A toy vehicle as claimed in claim 37, wherein a portion of said strip of metal is disposed generally horizontally between said motor and said battery, said horizontal strip positioned to be engaged by said electrical contact element.

39. A toy vehicle as claimed in claim 31, wherein said strip includes an opening for receiving an electrical contact element for charging said battery.

40. A toy vehicle as claimed in claim 39 wherein said strip with the opening connects the motor and a negative terminal of said battery.

41. A toy vehicle as claimed in claim 31, wherein said battery is generally cylindrical and is mounted in said chassis in a position located at a longitudinal axis transverse to the direction of movement of said vehicle.

42. A toy vehicle as claimed in claim 31, wherein said flexible metal strip includes a first tab located to engage a central portion of one of the terminals of the battery and a second tab located to engage a central portion and a noncentral portion of the other terminal of said battery whereby a short circuit is created should said battery be mounted in the chassis' first portion in a reversed manner.

43. A toy vehicle as claimed in claim 42, wherein said second tab comprises at least two mutually parallel tab portions.

44. A toy vehicle as claimed in claim 31, wherein said flexible metal strip includes a tab located adjacent one side of the chassis for engaging the positive terminal of the battery and at least two additional tabs located adjacent an opposite side of said chassis for engaging the negative terminal of said battery.

45. A toy vehicle as claimed in claim 44, wherein said two additional tabs are spaced one from the other so as to engage both terminals of the battery should the battery be mounted incorrectly.

46. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, a switch for selectively electrically interrupting said circuitry and a body member connected to the chassis the combination with said toy vehicle of a pad attached to the body member adjacent the battery to absorb battery fluid should the battery malfunction.

47. In a miniature electric toy vehicle having a front pair of wheels, a rear pair of wheels, a chassis connected to said wheels, said chassis having a first portion for receiving a small rechargeable battery and a second portion for receiving a small electric motor, a small rechargeable battery, a small electric motor, a switch for selectively electrically interrupting said circuitry and a body member connected to the chassis the combination with said toy vehicle of the switch being responsive to insertion of means for recharging the battery.

48. A miniature toy vehicle comprising:
a chassis;
front and rear wheels mounted to said chassis;
an electric motor mounted to said chassis, said electric motor having a rotatable armature shaft carrying at least one of said wheels;
a rechargeable battery operatively connected to said motor and mounted to said chassis;
a body member mounted to said chassis to cover said electric motor and said battery; and
means mounted to said chassis for connecting said battery to an external charging source.

49. A vehicle as claimed in claim 48, wherein said chassis has a rearwardly extending tab; and said body member has a slot for receiving said chassis tab for locating and positioning said body member relative said chassis.

50. A vehicle as claimed in claim 48, wherein said connecting means comprises an opening in said chassis.

51. A vehicle as claimed in claim 48, wherein said battery is generally cylindrical and is mounted in said chassis in a position located at a longitudinal axis transverse to the direction of movement of said vehicle.

52. A vehicle as claimed in claim 48, wherein:
at least two wheels are mounted on a thin wire axle; and
said chassis includes a flexible arm for engaging said axle and providing a biasing force on said axle.

* * * * *